UNITED STATES PATENT OFFICE.

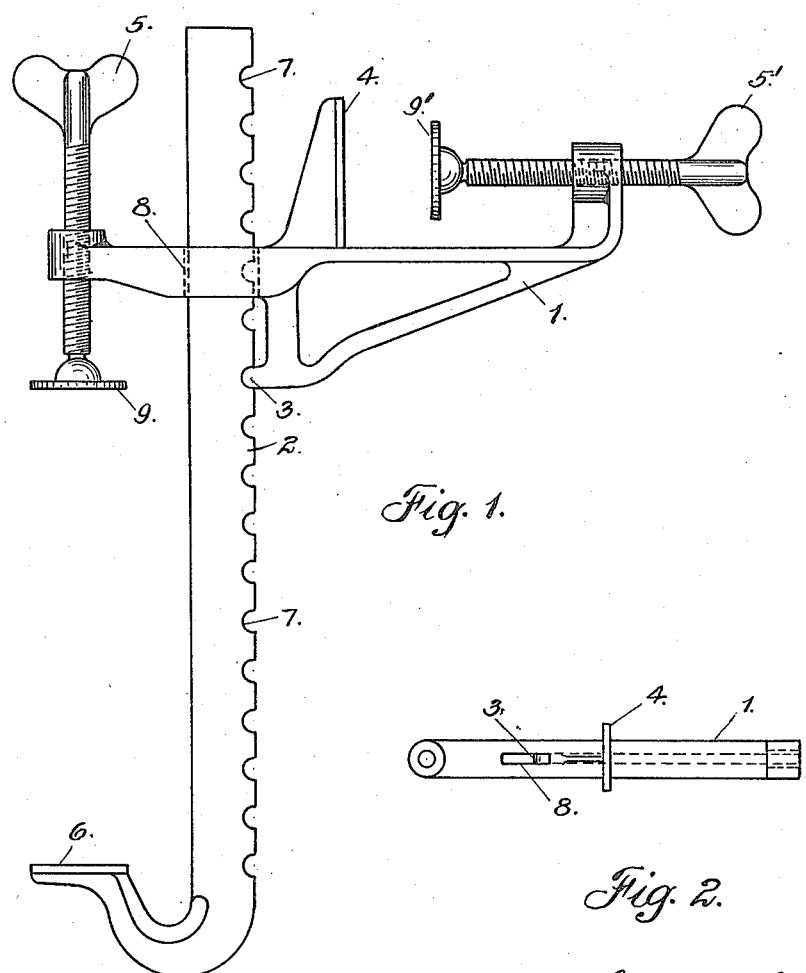

GEORGE H. SCHIEK AND GEORGE P. BITTERMANN, OF JOLIET, ILLINOIS.

CLAMP.

1,145,514.  Specification of Letters Patent.  Patented July 6, 1915.

Application filed October 12, 1914. Serial No. 866,216.

*To all whom it may concern:*

Be it known that we, GEORGE H. SCHIEK and GEORGE P. BITTERMANN, citizens of the United States, residing at Joliet, in the county of Will and State of Illinois, have invented a new and useful Improvement in Clamps, of which the following is a specification.

Our invention is a two-part foldable clamp, one part adjustable on the other, and the objects are to increase the adaptablity to materials to be clamped and to make the device compact and convenient to handle when not in operation.

In the accompanying drawing which illustrates our invention—Figure 1 is a side elevation of the device. Fig. 2 is a top view of the yoke of the device.

The yoke 1 is slidable upon the clamp plate 2 by means of slot 8 in said yoke, and said yoke is adjustable on said clamp plate at any point desired by means of the prong 3 and one of the notches 7 and is tightened in such position when the device is clamped to any work shop table or similar object by means of thumb-screw 5, washer 9 and jaw 6, after which, the device is in shape for dressing or filing wooden or metal material clamped by means of thumb-screw 5′, jaw 4 and washer 9′. As can be seen, the device has two distinct members that can be readily detached from each other and folded, one on the other, as soon as the device, itself, is detached from whatever object it has been clamped to. In this way, the device, when not in operation, can be put in a convenient shape for carrying from one place to another.

What we claim, is—

A two-part adjustable and detachable clamp, comprising, a base-plate provided with a series of transverse notches or grooves on one of its straight sides; a clamp-jaw on the turned end of said base-plate; a yoke slidable over said base-plate by means of a slot in said yoke; a prong formed integrally with said yoke and adapted to be engaged by any one of said notches; a thumb-screw operable through a threaded boxing at one end of said yoke; a clamp washer connectible to the end of said thumb-screw in a position opposite to said clamp jaw, whereby, said yoke may be made rigid on said base-plate when the device is clamped to any object; a thumb-screw bolt operable through a threaded boxing in the turned end of said yoke; a clamp-washer connectible to the end of said thumb-screw bolt; a clamp-jaw so connected to said yoke as to be opposite to said clamp-washer, whereby materials may be held rigidly for dressing, all as described and set forth.

GEORGE H. SCHIEK.
GEORGE P. BITTERMANN.

Witnesses:
 JOSEPH C. ZINSER,
 STEPHEN A. GOODSPEED.

Copies of this patent may be obtained for five cents each, by addressing the "Commissioner of Patents, Washington, D. C."